(12) United States Patent
Folken et al.

(10) Patent No.: US 10,982,602 B2
(45) Date of Patent: Apr. 20, 2021

(54) ENGINE WARM-UP BYPASS CONTROL

(71) Applicant: Caterpillar Inc., Peoria, IL (US)

(72) Inventors: Keith R. Folken, West Peoria, IL (US); David Ochoa, Boynton Beach, FL (US); Perry Converse, Lafayette, IN (US); Vijay Janardhan, Englewood, CO (US); Christian Andrés Herrera Hernandez, Houston, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/580,763

(22) Filed: Sep. 24, 2019

(65) Prior Publication Data

US 2021/0087984 A1 Mar. 25, 2021

(51) Int. Cl.
*F02D 25/00* (2006.01)
*F02D 41/06* (2006.01)
*G01M 15/04* (2006.01)
*H02J 9/08* (2006.01)

(52) U.S. Cl.
CPC ........... *F02D 25/00* (2013.01); *F02D 41/068* (2013.01); *G01M 15/048* (2013.01); *H02J 9/08* (2013.01); *F02D 2200/021* (2013.01)

(58) Field of Classification Search
CPC .. F02D 25/00; F02D 41/068; F02D 2200/021; G01M 15/048; H02J 9/08
USPC ........................................................ 123/685
See application file for complete search history.

(56) References Cited

U.S. PATENT DOCUMENTS

| 5,198,698 | A | * | 3/1993 | Paul | H02J 9/08 307/64 |
|---|---|---|---|---|---|
| 5,404,959 | A | | 4/1995 | Adkins, Sr. et al. | |
| 6,523,525 | B1 | * | 2/2003 | Hawkins | F01P 11/16 123/396 |
| 9,970,278 | B2 | | 5/2018 | Broussard et al. | |
| 2008/0157540 | A1 | * | 7/2008 | Fattal | B60L 58/30 290/40 R |
| 2009/0312885 | A1 | | 12/2009 | Buiel | |
| 2010/0156117 | A1 | * | 6/2010 | Allen | H02J 9/08 290/40 C |
| 2014/0277769 | A1 | * | 9/2014 | Matsuoka | H04L 12/2827 700/278 |

(Continued)

FOREIGN PATENT DOCUMENTS

CN 104832298 B 9/2017
WO 2012/061200 A2 5/2012

*Primary Examiner* — Mahmoud Gimie
(74) *Attorney, Agent, or Firm* — Harrity & Harrity LLP

(57) ABSTRACT

An engine controller to control a plurality of engines is disclosed. The engine controller may determine that power to a load is to be increased, wherein the load is configured to be powered by one or more of the plurality of engines; determine that an engine, of the plurality of engines, is configured to provide supplemental power to the load after a temperature of the engine satisfies a threshold, wherein the threshold corresponds to a warm-up operation of the engine being completed; determine that the temperature of the engine does not satisfy the threshold; obtain, via an operator interface, an authorization to bypass the warm-up operation of the engine; and bypass, based on obtaining the authorization, the warm-up operation for the engine to permit the engine to provide instantaneous power to the load.

20 Claims, 5 Drawing Sheets

(56) References Cited

U.S. PATENT DOCUMENTS

| | | | |
|---|---|---|---|
| 2014/0277795 A1* | 9/2014 | Matsuoka | G06F 16/955 700/291 |
| 2015/0177798 A1* | 6/2015 | Venishetti | G06F 1/26 713/300 |
| 2015/0239362 A1* | 8/2015 | Mizuno | B60L 11/1842 307/10.1 |
| 2019/0148745 A1* | 5/2019 | Aikawa | H01M 8/12 429/430 |
| 2020/0072137 A1* | 3/2020 | Cai | F02D 41/1406 |

\* cited by examiner

ENGINE WARM-UP BYPASS CONTROL

TECHNICAL FIELD

The present disclosure relates generally to engine control and, for example, to engine warm-up bypass control.

BACKGROUND

A plurality of engines may be used in various implementations to provide power to a load when a single engine is not sufficient to provide power to the load. For example, a plurality of generators may be configured to provide electrical power to a load that requires more power than a single generator can output. In some instances, power output from one or more of the plurality of engines can be controlled by particular configurations of an engine controller. For example, to use an engine to provide power, the engine controller may be configured to cause the engine to undergo one or more operations, such as a warm-up operation. However, such operations can delay and/or inhibit the load from receiving an amount of power that is required by the load at a particular moment. Such issues may be especially troublesome if the engine is cold and is to undergo a warm-up operation, but the load requires instantaneous power from the engine (e.g., because the load may have to wait for the engine to complete the warm-up operation).

One approach to control power is disclosed in U.S. Pat. No. 9,970,278 that issued to Broussard et al. on May 15, 2019 ("the '278 patent"). In particular, the '278 patent discloses a system and method for centralized monitoring and control of a hydraulic fracturing operation.

While the system and/or method of the '278 patent may enable control of power of a turbine, the system and/or method are configured to monitor whether an engine is ready to be loaded and/or a ready to load time remaining.

The engine controller of the present disclosure solves one or more of the problems set forth above and/or other problems in the art.

SUMMARY

According to some implementations, a method may include receiving a request to increase power to a load, wherein the load is configured to be powered by one or more of a plurality of engines; identifying an engine, of the plurality of engines, that is to provide additional power to the load; determining that an automatic control mode is enabled to control the engine to provide the supplemental power to the load, wherein the automatic control mode, when enabled, causes the engine to perform a warm-up operation before the engine is capable of providing the supplemental power; determining that the warm-up operation for the engine is to be bypassed; and causing the automatic control mode to bypass the warm-up operation for the engine to permit the engine to provide instantaneous power to the load by bypassing the warm-up operation associated with the engine.

According to some implementations, a device may include one or more memories; and one or more processors, communicatively coupled to the one or more memories, configured to: receive a request to increase power to a load, wherein the load is powered by a first engine of a plurality of engines; identify a second engine, of the plurality of engines, to provide supplemental power to the load; determine that a temperature of the second engine satisfies a threshold, wherein the threshold indicates that the second engine is to undergo a warm-up operation before the second engine is to provide the supplemental power to the load; determine that the warm-up operation is to be bypassed to permit the second engine to instantaneously provide supplemental power to the load; cause the second engine to perform a startup operation; and cause, in association with the startup operation, an output of the second engine to be electrically coupled to the load to cause the second engine to provide the supplemental power to the load before the temperature of the second engine reaches the threshold.

According to some implementations, a system may include a plurality of engines; a monitoring system configured to monitor the plurality of engines; and an engine controller configured to: determine that power to a load is to be increased, wherein the load is configured to be powered by one or more of the plurality of engines; determine that an engine, of the plurality of engines, is configured to provide supplemental power to the load after a temperature of the engine satisfies a threshold, wherein the threshold corresponds to a warm-up operation of the engine being completed; determine, from a measurement of the monitoring system, that the temperature of the engine does not satisfy the threshold; obtain, via an operator interface, an authorization to bypass the warm-up operation of the engine; and bypass, based on obtaining the authorization, the warm-up operation for the engine to permit the engine to provide instantaneous power to the load.

DETAILED DESCRIPTION

This disclosure relates to an engine controller. The engine controller has universal applicability to any machine or machines utilizing such an engine controller. As used herein, "machine" may refer to any machine that performs an operation associated with an industry such as, for example, fracturing, mining, construction, farming, transportation, or any other industry. As some examples, the machine may be a generator system, a vehicle (e.g., a land-based vehicle or marine vehicle), a fracture rig, and/or the like. Moreover, one or more implements and/or systems may be connected to the machine and/or controlled by the engine controller.

Figure 1:
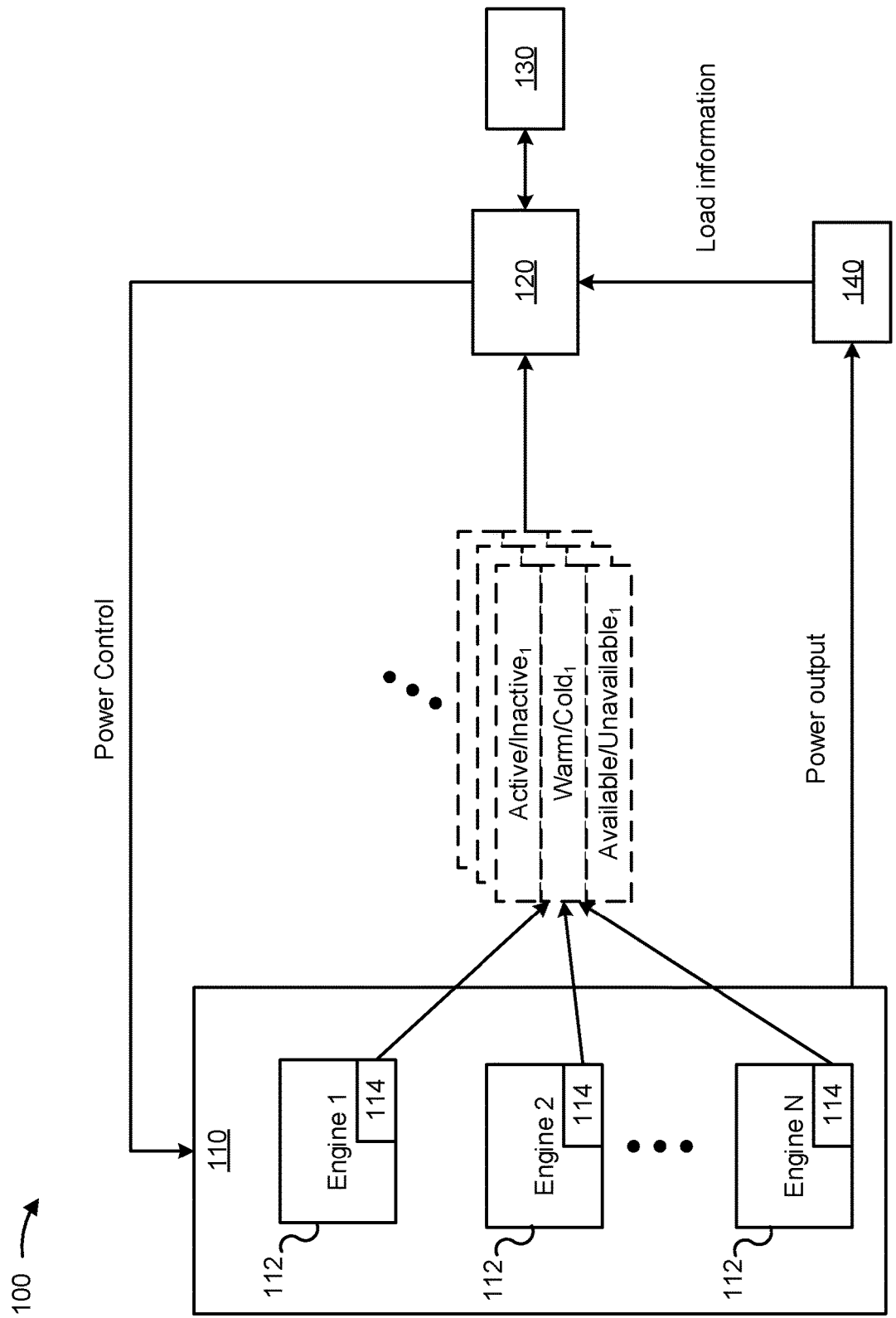
FIG. 1 is diagram of an example power system described herein.

FIG. 1 is a diagram of an example power system 100 described herein.

Power system 100 of FIG. 1 includes power generation system 110 with a plurality of engines 112 (shown as engine 1 to engine N, where N is an integer and N>1) and corresponding engine control modules (ECMs) 114, an engine controller 120, an operator station 130, and a load 140. The plurality of engines 112 may be referred to herein collectively as "engines 112" or individually as "engine 112." As shown and described herein, engine controller 120 may control engines 112 of power generation system 110 to provide mechanical and/or electrical power to load 140.

The plurality of engines 112 may be a plurality or set of generators (e.g., which may be referred to as a "generator set") configured to provide electrical power to load 140. As described herein, one or more of engines 112 may include a compression ignition, internal combustion engine. Additionally, or alternatively, one or more of engines 112 may include any other type of internal combustion engine, such as, for example, a spark, laser, or plasma ignition engine. Engines 112 may be fueled by distillate diesel fuel, biodiesel, dimethyl ether, gaseous fuels, such as hydrogen, natural gas, propane, alcohol, ethanol, and/or any combination thereof.

One or more of engines 112 may be a same type of engine. For example, all engines 112 may be made by a same manufacturer, be a same model, be configured to output a same amount of maximum power and/or torque, be configured to operate in a same manner, and/or the like. Alternatively, one or more of the engines 112 may be a different type relative to another engine 112. In such cases, a first engine may be a first type of engine configured to output a first amount of maximum power and a second engine may be a second type of engine configured to output a second amount of maximum power that is different from the first amount of maximum power.

Furthermore, the engines 112 may be made by a different manufacturer and/or be a different model of engine.

ECMs 114 include one or more devices that provide corresponding control of engines 112 based on power control information from engine controller 120. ECM 114 is implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), and/or another type of processing component. The processor is implemented in hardware, firmware, or a combination of hardware and software. ECM 114 may include one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by ECM 114. Further, ECM 114 may include a memory (e.g., a non-transitory computer-readable medium) capable of storing instructions, that when executed, cause the processor to perform one or more processes and/or methods described herein.

ECM 114 may execute the instructions to perform various control functions and processes to control engines 112 according to instructions from engine controller 120. ECM 114 may include any appropriate type of engine control system configured to perform engine control functions such that engines 112 may operate properly. Further, ECM 114 may also control another system of a vehicle or machine, such as a transmission system, a hydraulics system, and/or the like.

Engine controller 120 includes one or more devices that provide power control information to control power output from power generation system 110. Engine controller 120 may use the power control information to cause ECMs 114 to control respective amounts of power that are provided from engines 112 to load 140. Engine controller 120 is implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. Engine controller 120 may include one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by engine controller 120. Engine controller 120 may include a memory (e.g., a non-transitory computer-readable medium) capable of storing instructions, that when executed, cause the processor to perform one or more processes and/or methods described herein.

Engine controller 120 may execute the instructions to perform various control functions and processes to cause ECMs 114 to control engines 112 based on load information, operator input from operator station 130, and/or one or more parameters or one or more metrics of power generation system 110. Engine controller 120 may include any appropriate type of engine control system configured to perform optimization functions, prioritization functions, and/or power control functions.

Engine controller 120 may be configured to operate in an automatic control mode. In such cases, engine controller 120 may execute computer software instructions to perform various control functions and processes to control power generation system 110, determine whether an engine 112 is to provide power to load 140, determine or select which engine 112 is to provide power to load 140 (e.g., based on a prioritization scheme), determine when an engine 112 is to provide power to load 140 (e.g., based on one or more operating characteristics of engine 112, based on load information and/or a load request, based on health of one or more other engines 112, and/or the like), determine an amount of power is to be output by engine 112, and/or the like.

As shown in the example of FIG. 1, engine controller 120 (e.g., via execution of the computer software instructions) provides power control information to power generation system 110 to cause power generation system 110 to provide power output to load 140 according to one or more operating characteristics of engines 112, information from operator station 130, and/or information from load 140. For example, the power control information may include instructions to ECMs 114 to cause ECMs to provide power to load 140, to perform one or more operations (e.g., a startup operation, a warm-up operation, a power supply operation, and/or the like), to bypass one or more operations, and/or the like. As a specific example, as described herein, if load 140 is to receive instantaneous supplemental (or additional) power because a load requirement of the load has increased (e.g., satisfied a threshold that cannot be satisfied by current power output), engine controller 120 may determine that another engine 112 is to output power to load 140 and that a warm-up operation of that engine 112 is to be bypassed to permit that engine 112 to provide instantaneous power to load 140. A warm-up operation may include monitoring a temperature of an engine to determine that the temperature has reached a threshold temperature that indicates that the engine is warmed-up (e.g., running within a standard operational temperature range) and preventing power output from the engine until the engine is warmed-up.

To control power output of engines 112 and/or determine whether a warm-up operation of an engine is or can be bypassed, engine controller 120 may receive (e.g., from ECMs 114 and/or sensors associated with engines 112) measurements and/or information (e.g., operational status information) associated with engines 112. For example, as shown in FIG. 1, some of the measurements and/or information may indicate whether engines 112 are active or inactive (e.g., providing power to load 140 or not providing power to load 140), warm or cold (e.g., based on temperatures of engines 112), and/or available or unavailable (e.g., based on whether engines 112 are locked or shutdown (e.g., due to being manually locked, experiencing failures, and/or the like), whether engines 112 are operational or not operational, and/or the like). Accordingly, as described herein, based on the measurements and/or information, engine controller 120 may determine a status of engine 112 and correspondingly determine whether a warm-up operation of engine 112 can be bypassed.

According to some implementations described herein, engine controller 120 may determine that an engine 112, when being configured to provide supplemental power to load 140, is to bypass a warm-up operation to provide instantaneous power to load 140 based on an operator input from operator station 130. For example, after receiving a request to increase power output from power generation system 110 from operator station 130 and/or load 140, an operator, as described herein, may have the option to bypass a warm-up operation of an engine 112 that is to be activated to provide power to load 140. As described herein, engine controller 120 may provide the option to the operator via an operator interface of operator station 130. For example, based on one or more characteristics of engine 112 (e.g., the temperature of engine 112, whether engine 112 is available or unavailable, whether engine 112 is permitted to have a warm-up operation bypassed, and/or the like), engine controller 120 may prompt the operator to offer to bypass the warm-up operation, may enable an operator input to be selected by the operator to bypass the warm-up operation, and/or the like. Additionally, or alternatively, the engine controller 120 may determine that a warm-up operation is to be bypassed automatically (or without a use input), as described herein.

As described herein, instantaneous power from an engine (e.g., engine 112) that is cold corresponds to any power that is output from the engine before a temperature of the engine warms to (or reaches) a threshold (e.g., a threshold temperature corresponding to engine 112 being warmed-up and/or operating within a standard operational temperature range). Further, an engine, as described herein, is considered to be cold when a temperature of the engine, a temperature of a component of the engine (e.g., a component of a cooling system), a temperature of a fluid (e.g., coolant, lubricant, fuel, and/or the like) associated with the engine is below a corresponding temperature threshold (e.g., the temperature that indicates that the engine is warmed-up and/or within a standard operational temperature range).

Accordingly, as described herein, the engine controller 120 may determine whether a warm-up operation of an engine 112 can be bypassed and/or is to be bypassed and, correspondingly, communicate with operator station 130 and/or control power output from the engine 112 (and/or other engines currently providing power to load 140) via communication with corresponding ECMs 114.

As indicated above, FIG. 1 is provided as an example. Other examples may differ from what is described in connection with FIG. 1.

Figure 2:
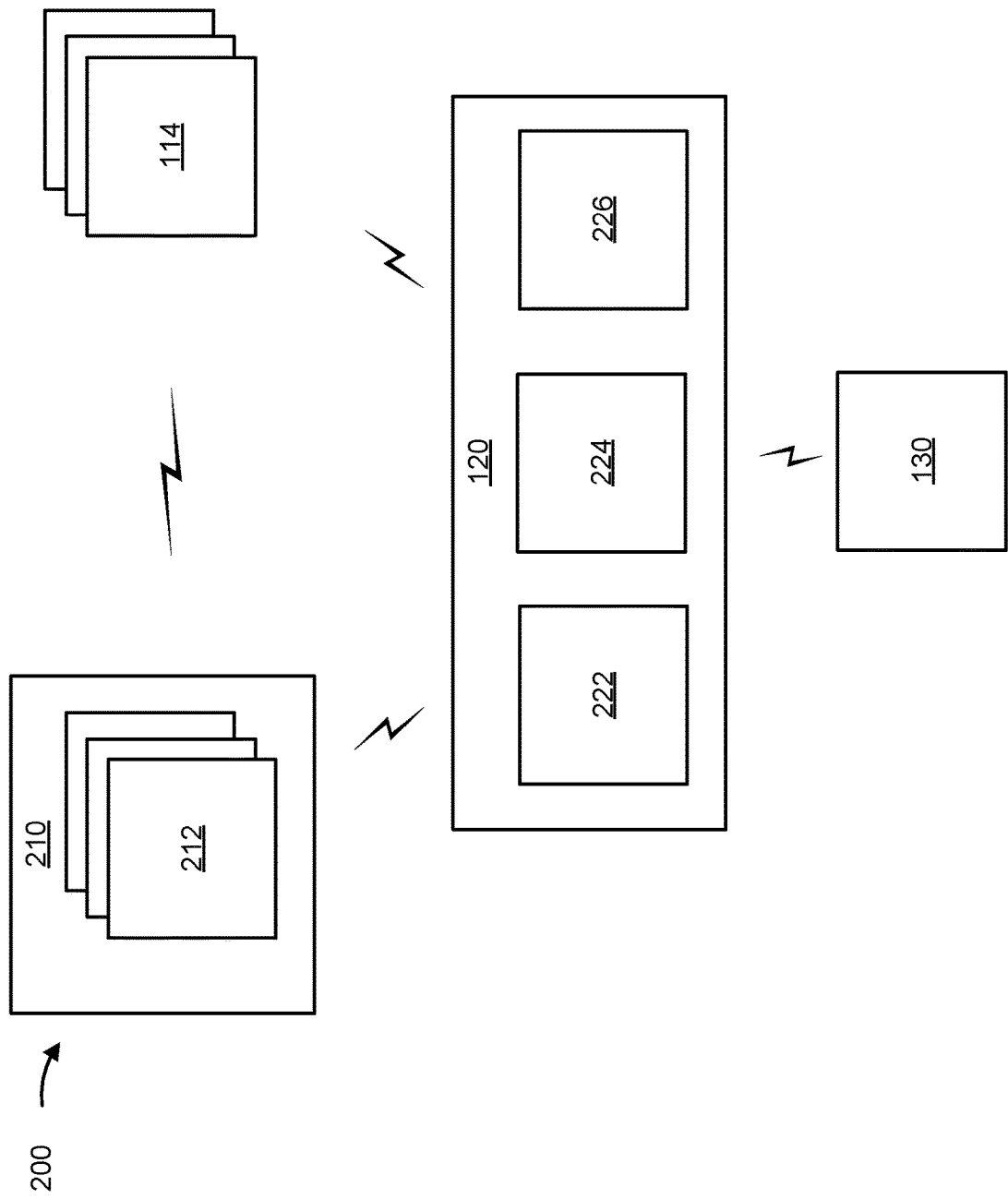
FIG. 2 is a diagram of an example engine control system that may be included within the power system of FIG. 1, as described herein.

FIG. 2 is a diagram of an example engine control system 200 that may be included within the power system 100 of FIG. 1, as described herein. As shown in FIG. 2, engine control system 200 includes ECMs 114, engine controller 120, and monitoring system 210. The components of engine control system 200 may be configured to communicate via wired communication and/or wireless communication.

Monitoring system 210 includes one or more monitoring devices 212 (which may be referred to herein individually as "monitoring device 212" or collectively as "monitoring devices 212"). Further, engine controller 120 includes a bypass control module 222, an operator interface module 224, and an engine output module 226.

Monitoring system 210 may provide measurements associated with various parameters used by engine controller 120 and/or ECMs 114 to control one or more engines (e.g., one or more of engines 112) and/or to determine whether a warm-up operation of an engine can be bypassed and/or is to be bypassed. Monitoring system 210 includes one or more monitoring devices 212. Monitoring devices 212 may include one or more sensors (e.g., one or more temperature sensors, one or more locking sensors (e.g., used to indicate whether a machine is manually locked or unavailable), and/or the like. As used herein, parameters may be directly measured and/or estimated by monitoring devices 212. Additionally, or alternatively, parameters may also be measured indirectly and/or calculated, based on readings of physical sensors, by monitoring devices 212, monitoring system 210, ECM 114, and/or engine controller 120. Measurements and/or information from monitoring devices 212, may refer to any values or information relevant to the one or more parameters and indicative of a state or condition of an engine. For example, measurements may include machine and/or environmental parameters, such as temperature values, pressure values, ambient conditions, fuel rates, engine speeds, vibrations and/or oscillations, usage time, usage rate, total power output, and/or the like.

Monitoring system 210 may be configured to coincide with ECMs 114 and/or engine controller 120, may be configured as a separate system, and/or may be configured as a part of other systems. Further, ECMs 114 and/or engine controller 120 may implement the monitoring system 210 by using computer software, hardware, or a combination of software and hardware. For example, ECMs 114 and/or engine controller 120 may execute instructions to cause monitoring devices 212 of monitoring system 210 to sense, measure, and/or generate values for one or more parameters based on a computational model and other parameters.

As described herein, engine controller 120 may use such measurements and/or information in an automatic control mode to control power output from an engine. Additionally, or alternatively, engine controller 120 may use the measurements and/or information to determine whether an engine is available to provide supplemental power to a load (e.g., load 140), whether the engine is warm or cold, whether the engine is currently providing power to the load or is not currently providing power to the load (e.g., whether an output of the engine is electrically coupled to the load), and/or the like.

Engine controller 120 may include one or more modules, components, and/or devices to determine a power output configuration for one or more engines (e.g., engines 112) according to one or more measurements and/or information associated with the engines. Engine controller 120 may determine and/or implement the power output configuration to power the engines using any suitable technique (e.g., a power optimization technique, a load balancing technique, and/or the like). Engine controller 120 may be configured to have an automatic control mode, as described herein, that permits automated adjustment to the power output configuration of the engines while supplying power to a load. Engine controller 120 and/or the automatic control mode of engine controller 120 may be configured via an operator interface (e.g., one or more input components (e.g., a keyboard, touchscreen, microphone, a mouse, and/or the like) and/or output components (e.g., a display screen, speaker, and/or the like)) of operator station 130. Accordingly, engine controller 120 may identify individual engines of a plurality of engines, determine individual statuses of the engines, determine individual bypass capabilities of the engines, and/or individually control power output from the engines as described herein.

Bypass control module 222 may include one or more components or devices configured to identify whether an automatic control mode associated with the engine can be bypassed. For example, bypass control module 222 may be used to determine whether an automatic control mode configured to cause an engine to perform a warm-up operation before providing power to a load can be overridden such that the warm-up operation can be bypassed to permit the engine, when cold, to provide instantaneous power to the load. As shown, bypass control module 222 may be included within and/or implemented with engine controller 120.

Operator interface module 224 may be configured to enable communication with operator station 130. For example, operator interface module 224 may include one or more communication interfaces that permits engine controller 120 to send outputs (e.g., engine status information, measurements, and/or the like) to operator station 130 and/or receive operator inputs from operator station 130.

Engine output module 226 causes the engines to provide power to the load based on information associated with bypass control module 222 and/or operator interface module 224. For example, engine output module 226 may provide instructions to ECMs 114 to cause the ECMs 114 to perform and/or bypass one or more operations of the engines, as described herein. For example, engine output module 226 may cause an engine to perform a startup operation to provide power (e.g., supplemental power) to the load. Such a startup operation may include an ignition operation to start the engine (e.g., by engaging an ignition of the engine). Additionally, or alternatively, engine output module 226 may cause the engine to bypass a warm-up operation (e.g., a warm-up operation associated with the start-up operation) to permit the engine to provide instantaneous power to the load before the engine is warmed-up. As such, the ECMs 114 may accordingly perform the operations and/or bypass the operations as determined and/or indicated by the one or more modules of engine controller 120.

Bypass control module 222 may be configured to determine whether an operation of an engine can be bypassed to permit the engine to provide power to a load. For example, bypass control module 222 may determine whether a warm-up operation of an engine that is to provide supplemental power to the load can be bypassed (e.g., based on a temperature of the engine, based on an indication that the engine is locked or shutdown, based on a determination that the engine is inoperable, and/or the like). In such cases, bypass control module 222 may determine or identify that the engine is to provide the supplemental power to the load (e.g., as determined by engine controller 120 and/or by an automatic control mode of engine controller 120 that selects the engine to provide power to the load). In some cases, bypass control module 222 may verify or confirm that the engine is available to provide power to the load (e.g., by determining whether the engine is locked or inoperable). Further, bypass control module 222 may determine a temperature of the engine to determine whether the warm-up operation can be bypassed or can be authorized to be bypassed. For example, if the engine is already warm, the automatic control mode of engine controller 120 may cause the engine to automatically bypass the warm-up operation (e.g., because the warm-up operation is unnecessary). Furthermore, if the engine is already warm, the warm-up operation does not need to be made available to be bypassed. Accordingly, in such cases, bypass control module 222 may determine that an override of engine controller 120 (e.g., an override of the automatic control mode and/or an override that bypasses the warm-up operation) does not need to be enabled (or activated). Additionally, or alternatively, bypass control module 222 may determine that an operator input, associated with an operator interface of operator station 130 that can be used to override the automatic control mode and/or bypass the warm-up operation, does not need to be enabled or offered to an operator.

Furthermore, bypass control module 222 may be configured to enable and/or cause an operation of an engine to be bypassed. For example, bypass control module 222 may be configured to enable a warm-up operation to be bypassed when a cold engine is in a condition to provide instantaneous power to a load. More specifically, when an engine is to provide supplemental power to a load (e.g., based on a request received from the load indicating that power output from a power generator system is to be increased, based on a request received from operator station 130, and/or the like), and the engine is not running and/or is cold, bypass control module 222 may cause operator interface module 224 to enable an operator input associated with operator station 130 to be enabled. For example, operator interface module 224 may provide an operator interface control message that causes an operator interface to activate an operator input element (e.g., enable the operator to select or provide an operator input via the operator input element) that can be used to authorize the engine controller 120 to cause the engine to bypass the warm-up operation of the engine. Additionally, or alternatively, operator interface module 224 may instruct the operator interface to prompt the operator to authorize the warm-up operation to be bypassed to permit the cold engine to provide instantaneous power to the load. In this way, engine controller 120 may use bypass control module 222 and/or operator interface module 224 to determine whether a warm-up operation of an engine is to by bypassed.

Bypass control module 222 may be configured to cause the engine to bypass the warm-up operation based on an operator input based on load information (e.g., based on a request from a load indicating a need for instantaneous power from a cold engine). For example, based on receiving an operator input that indicates that the warm-up operation of a cold engine is to be bypassed, bypass control module 222 may cause engine output module 226 to control the engine to bypass the warm-up condition to permit the cold engine to provide instantaneous power to the load. As described herein, the engine may provide power to a load by electrically coupling an output of the engine (e.g., a mechanical output and/or electrical output) to the load. Accordingly, when causing an engine to bypass a warm-up operation, engine output module 226 (e.g., based on instructions from bypass control module 222) may cause ECM 114 of the engine to electrically couple the output of the engine to the load before the engine is warmed-up (e.g., before a temperature of the engine reaches a threshold, while the engine is still cold, and/or the like).

Bypass control module 222 may be configured to automatically cause a cold engine to bypass the warm-up operation based on load information from the load. For example, bypass control module 222 may analyze a load requirement of the load, determine a current power output from a set of engines that are currently providing power to the load, and determine that the current power output does not or will not satisfy the load requirement. Furthermore, bypass control module 222 may determine that the load requirement requires supplemental power within a time period that is shorter than a time period required for the engine to warm up. Accordingly, bypass control module 222 may cause the automatic control mode (or override a configuration of the automatic control mode that requires the engine to perform the warm-up operation) to control the engine to bypass the warm-up operation to permit the cold engine to provide instantaneous power to the load. In this way, engine controller 120 may use bypass control module 222 and/or engine output module 226 to control power and/or one or more operations of an engine via ECMs 114.

As indicated above, FIG. 2 is provided as an example. Other examples may differ from what was described in connection with FIG. 2.

Figure 3:
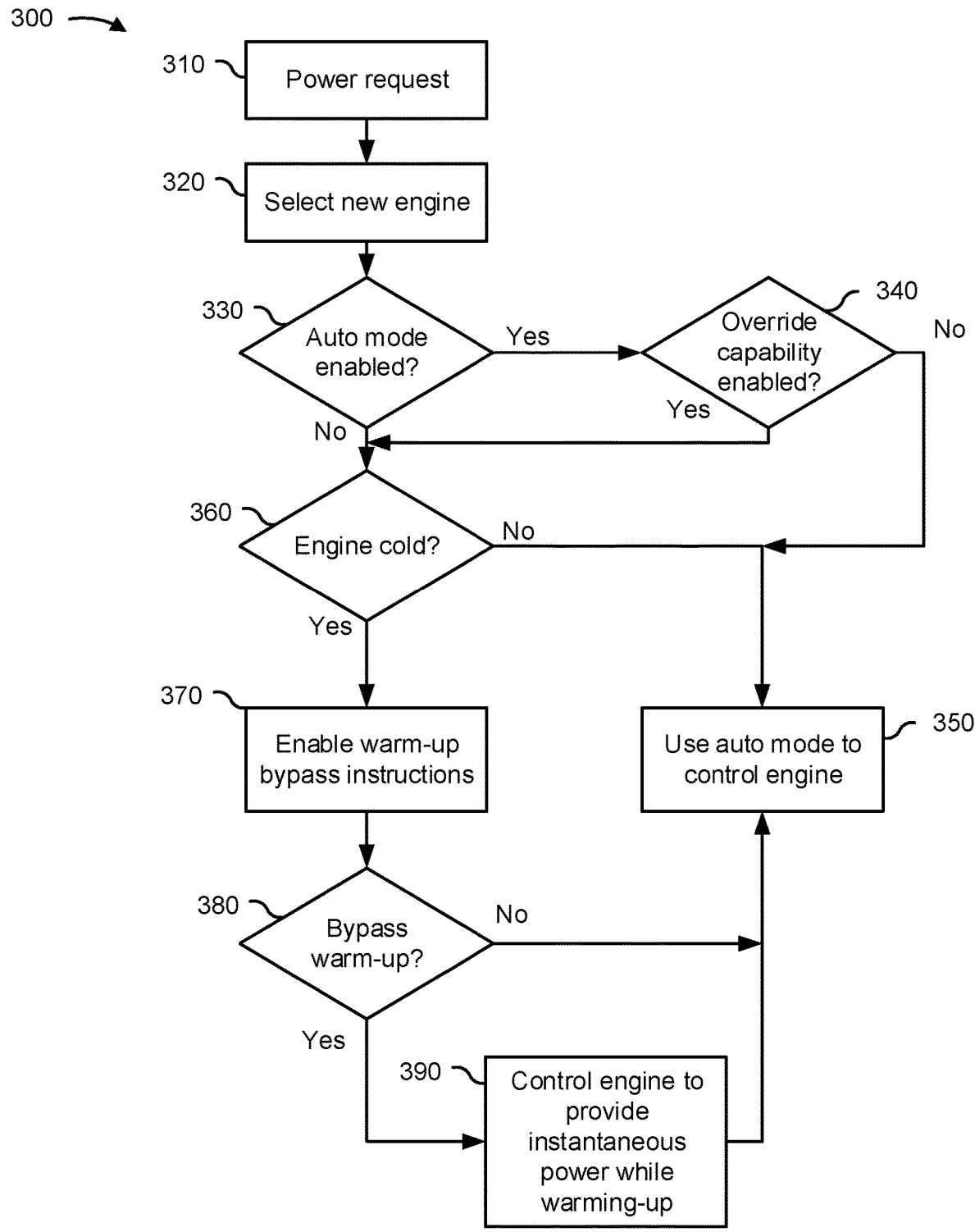
FIG. 3 is a diagram of example control logic that may be implemented by an engine controller described herein.

FIG. 3 is a diagram of example control logic 300 that may be implemented by an engine controller, as described herein. One or more process blocks of FIG. 3 may be performed by an engine controller (e.g., engine controller 120). In some implementations, one or more process blocks of FIG. 3 may be performed by another device or a group of devices separate from or including the engine controller, such as a monitoring system (e.g., monitoring system 210), an ECM (e.g., ECM 114), and/or the like.

As shown in FIG. 3 and by block 310, a power request is received and/or obtained. For example, a load (e.g., load 140) and/or an operator (e.g., via operator station 130) may provide a power request to the engine controller. The power request may indicate one or more of an amount of power required, a type of power required, a length of time associated with providing the power, a degree of importance of the power (or of tasks or processes that may be using the power), a status of the load, and/or the like. At block 320, a new engine may be selected to provide supplemental power according to the power request. For example, the engine controller (e.g., via an automatic control mode) may determine that an additional engine is needed to provide supplemental power to the load.

As further shown in FIG. 3, at block 330, the engine controller may determine whether an automatic control mode is enabled. The automatic control mode may correspond to a mode that causes the engine controller to control power output and/or operations of the engine. If the automatic control mode is enabled, the engine controller may determine whether override capability for the engine is enabled at block 340. For example, override capability may be enabled and/or disabled based on a setting of the engine (e.g., a setting that may be configured based on an operator input or preference), whether the engine is capable of providing instantaneous power when cold, and/or the like. If the override capability is not enabled, control advances to block 350, where automatic control mode is configured to control the engine.

If the override capability is enabled, at block 360, the engine controller determines whether the engine is cold. For example, the engine controller may determine whether a measurement of a temperature associated with the engine (e.g., a temperature of a component of the engine, a temperature of a fluid of the engine, and/or the like) satisfies a threshold temperature indicating that the engine is cold (e.g., if the temperature is below a threshold). At block 360, if the engine is not cold, control advances to block 350. If the engine is cold, at block 370, the engine controller enables warm-up bypass instructions to be received and/or determined (e.g., by enabling an operator interface element of an operator station, by overriding automatic control mode, and/or the like).

As further shown in FIG. 3, at block 380, the engine controller may determine whether the warm-up operation is to be bypassed. If the engine controller determines that the warm-up is not to be bypassed (e.g., no response is received within a threshold time period and/or while the engine is warming-up, current power output satisfies a current or upcoming load requirement), control advances to block 350. If the engine controller, at block 380, determines that the warm-up operation is to be bypassed, at block 390, the engine controller may control the engine to provide instantaneous power while warming-up. As described herein, the engine controller determines that the warm-up operation is to be bypassed based on receiving warm-up bypass instructions (e.g., as an operator input from the operator station) and/or based on an analysis of the load requirement and current power output from engines providing power to the load.

As indicated above, FIG. 3 is provided as an example. Other examples may differ from what was described in connection with FIG. 3.

Figure 4:
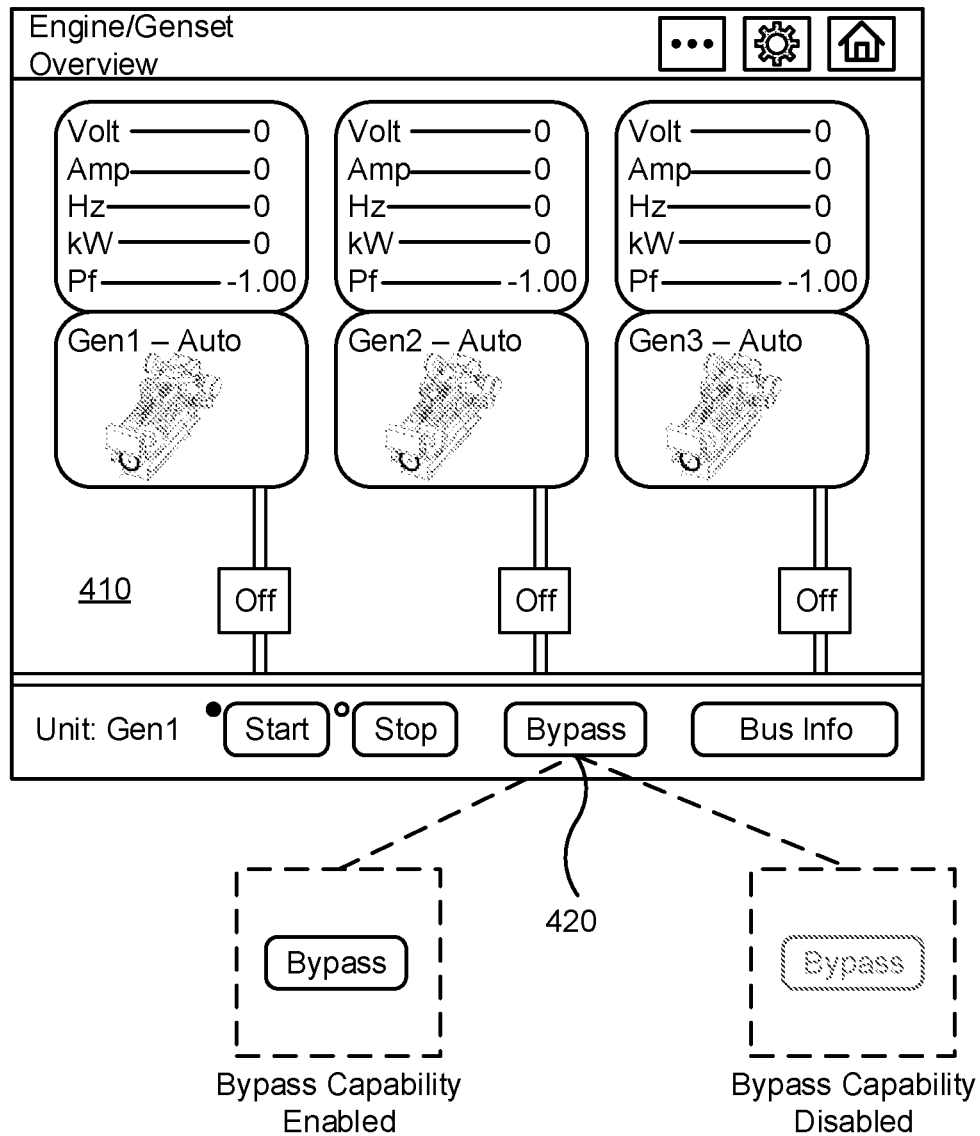
FIG. 4 is a diagram of an example operator interface that may be implemented in associated with an engine controller described herein.

FIG. 4 is a diagram of an example operator interface 400 that may be implemented in associated with an engine controller described herein. Operator interface 400 may include and/or be associated with one or more input components (e.g., a touchscreen, a mouse, a keyboard, and/or the like) and/or output components (e.g., a display device). For example, operator interface 400 may be a graphical user interface (GUI) that can be presented on a touchscreen to display information and receive operator inputs via the touchscreen. Additionally, or alternatively, operator interface 400 may be a GUI presented on a display that may receive operator inputs via one or input components.

As shown in the example of FIG. 4, operator interface 400 includes an engine status display area 410 and a bypass authorization input element 420. Engine status display area 410 may indicate status information associated with a set of engines that can be monitored and/or controlled via operator interface 400. For example, status display area may indicate which engines, of the set of engines, are currently powered on and operating characteristics of the engines, such as a voltage ("Volt") provided by an engine, a current provided by the engine ("Amps"), a frequency output from the engine ("Hz"), a power output ("kW") from the engine, and/or power factor (N) of the engine. Accordingly, operator interface 400 permits an operator to determine whether engines are providing enough power to satisfy a load requirement of a load.

Bypass authorization input element 420 may include any type of operator input element (e.g., a clickable, such as a button of a GUI, a button of a control console, a key of a keyboard or keypad, and/or the like). As shown in FIG. 4, bypass authorization input element 420 may be button of operator interface 400. As shown in the example, bypass authorization input element 420 may be enabled and/or disabled according to whether bypass capability for an operation (e.g., a warm-up operation) of a selected unit (one of the engines selected in the engine status display area 410) can be bypassed. As shown, when disabled (e.g., because the engine is already warm, because the engine is locked, because the engine cannot provide power when cold, and/or the like), the bypass authorization input element 420 may be grayed out to indicate that the operator cannot use the bypass authorization input element 420 or that an operation of the engine cannot be bypassed. On the other hand, when the bypass capability is enabled, the bypass authorization input element 420 may be activated (e.g., presented as clickable or not grayed out) to indicate that an operation of the engine can be bypassed and/or the bypass authorization input element 420 can be used to bypass the operation.

According to some implementations, in addition to, or as an alternative to the bypass authorization input element 420, the engine controller may overlay a dialog box over one or more portions of operator interface 400 (e.g., over engine status display area 410) that includes an operator input element to bypass a particular operation (e.g., in a similar manner as bypass authorization input element 420). For example, the dialog box may be presented to the user based on determining that a particular operation of an engine is capable of being bypassed. The dialog box may request the operator to indicate whether the operation is to be bypassed (e.g., based on whether the load is to receive instantaneous power). In this way, the operator may be alerted via the dialog box, and thus, permitted to authorize the operation to be bypassed by the engine controller, as described herein.

In this way, operator interface 400 may permit an operator to see status information associated with engines providing power to a load and/or manually override an automatic control mode of the engines to bypass one or more operations that are configured to be performed according to the automatic control mode.

Figure 5:
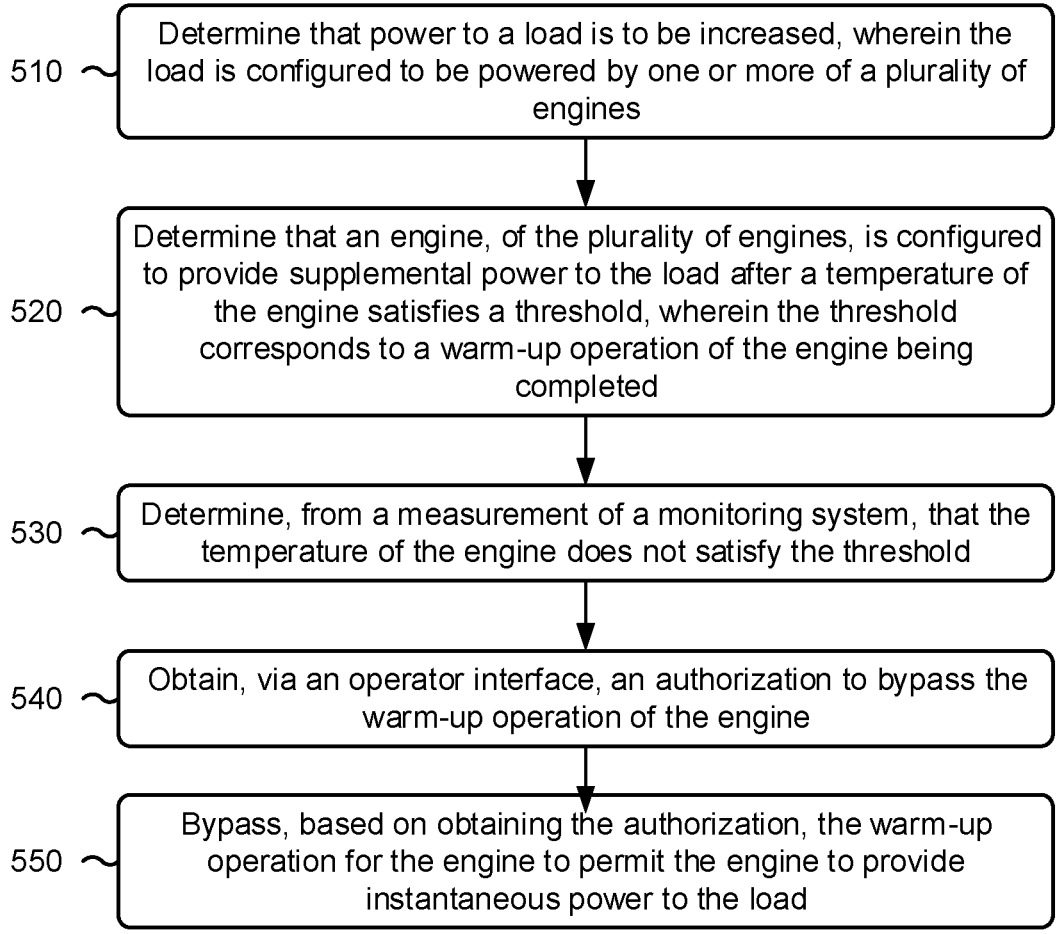
FIG. 5 is a flowchart of an example process associated with engine warm-up bypass control.

FIG. 5 is a flowchart of an example process 500 associated with engine warm-up bypass control. One or more process blocks of FIG. 5 may be performed by an engine controller (e.g., engine controller 120). In some implementations, one or more process blocks of FIG. 5 may be performed by another device or a group of devices separate from or including the engine controller, such as an ECM (e.g., ECM 114), an operator station (e.g., operator station 130), a monitoring system (e.g., monitoring system 210), and/or the like.

As shown in FIG. 5, process 500 may include determining that power to a load is to be increased, wherein the load is configured to be powered by one or more of the plurality of engines (block 510). For example, the engine controller (e.g., using bypass control module 222, operator interface module 224, engine output module 226, and/or the like) may determine that power to a load is to be increased, as described above, and the load may be configured to be powered by one or more of the plurality of engines. The plurality of engines may be generators of a power system and the power provided to the load may be electrical power.

The engine controller may be configured to determine that the power to the load is to be increased based on receiving, via the operator interface, a request to increase the power to the load. In some implementations, when prompting the operator, the engine controller is configured to cause a dialog box to be presented via the operator interface and the dialog box requests the operator to indicate whether the engine is to provide the instantaneous power to the load. Additionally, or alternatively, the engine controller may be configured to determine that the power to the load is to be increased based on receiving a request from the load.

As further shown in FIG. 5, process 500 may include determining that an engine, of the plurality of engines, is configured to provide supplemental power to the load after a temperature of the engine satisfies a threshold, wherein the threshold corresponds to a warm-up operation of the engine being completed (block 520). For example, the engine controller (e.g., using bypass control module 222, operator interface module 224, engine output module 226, and/or the like) may determine that an engine, of the plurality of engines, is configured to provide supplemental power to the load after a temperature of the engine satisfies a threshold, as described above. In some implementations, the threshold corresponds to a warm-up operation of the engine being completed.

As further shown in FIG. 5, process 500 may include determining, from a measurement of the monitoring system, that the temperature of the engine does not satisfy the threshold (block 530). For example, the engine controller (e.g., using bypass control module 222, operator interface module 224, engine output module 226, and/or the like) may determine, from a measurement of the monitoring system, that the temperature of the engine does not satisfy the threshold, as described above.

As further shown in FIG. 5, process 500 may include obtaining, via an operator interface, an authorization to bypass the warm-up operation of the engine (block 540). For example, the engine controller (e.g., using bypass control module 222, operator interface module 224, engine output module 226, and/or the like) may obtain, via an operator interface, an authorization to bypass the warm-up operation of the engine, as described above.

The engine controller, when obtaining the authorization, may prompt, via the operator interface, an operator to provide an operator input corresponding to the authorization. Additionally, or alternatively, the engine controller, when obtaining the authorization, may enable the operator interface to permit the operator to provide the authorization (e.g., by activating an operator input element, such as a bypass authorization input element).

As further shown in FIG. 5, process 500 may include bypassing, based on obtaining the authorization, the warm-up operation for the engine to permit the engine to provide instantaneous power to the load (block 550). For example, the engine controller (e.g., using bypass control module 222, operator interface module 224, engine output module 226, and/or the like) may bypass, based on obtaining the authorization, the warm-up operation for the engine to permit the engine to provide instantaneous power to the load, as described above.

The engine controller may be configured to cause the engine to provide the instantaneous power to the load after causing the engine to perform an ignition operation to start the engine. For example, the engine controller may cause the engine to perform a startup operation; and enable (or cause) electrical coupling of an output of the engine to the load before the engine reaches a threshold temperature corresponding to the engine completing the startup operation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

In some instances, a load may require more than one engine to adequately power the load. For example, an electrical system of a fracturing rig, a construction site, a marine vessel, and/or the like may require sets of engines or sets of generators to provide power. In some instances, automatic control modes may be configured to cause one or more engines to perform one or more operations when the engines are to provide power to a load. However, the load may require instantaneous power due to an unexpected increase in a load requirement of the load. Without the additional, instantaneous power, the load may experience a failure, experience a breakdown, or be damaged.

As a specific example, a fracturing rig may encounter relatively hard or course material during a drilling operation, increasing the load requirement of the fracturing rig. In such cases, the fracturing rig may require an instantaneous increase in power from a power system to prevent a drilling component from breaking or becoming lodged in the material. Further, in such cases, the power system may need to activate or start an additional engine to provide supplemental power to account for the increased load requirement (e.g., because a current power output configuration does not provide enough power to satisfy the load requirement). In such cases, the engine is likely cold and the automatic control mode would require a warm-up operation of the engine to be performed/completed before the engine can provide the supplemental power to the load. Performing such operations delays the engine from providing power to the load, thereby preventing the engine from supplying instantaneous power to the load.

According to some implementations described herein, engine controller 120 may cause an engine (that is configured with an automatic control mode) to bypass a warm-up operation to permit the engine to provide instantaneous power to the load. For example, engine controller 120 may determine that instantaneous power is required (e.g., based on a load requirement of the load and/or an operator input from an operator), and cause the engine to bypass the warm-up operation by overriding the automatic control mode (and/or causing the automatic control mode to bypass the warm-up operation).

The engine controller 120 may permit the warm-up operation to be bypassed based on an operator input (e.g., an authorization to override the automatic control mode). Accordingly, when an operator determines that a load requirement of load 140 has increased or is about to increase, the operator can indicate, via operator station 130, that an additional engine is to provide power to the load and the warm-up operation for the engine is to be bypassed to instantaneously (or within a threshold time period) satisfy an increased load requirement. The operator can be notified of the potential increase in load and/or the ability to bypass the warm-up operation (e.g., via a prompt, and/or activation of a bypass authorization input element). In this way, the operator may be able to quickly act to further improve turnaround time with respect to increasing the power output.

Accordingly, as described herein, engine controller 120 may enable a cold engine, of a plurality of engines, to instantaneously provide power to a load by causing the engine to bypass a warm-up operation, thus conserving resources associated with a load. Such resources may include hardware resources of the load (e.g., tools powered by the engine), computing resources of the load (which may experience failure or become damaged due to lack of power), costs (e.g., replacement costs, downtime costs, and/or the like), and/or the like.

As used herein, the articles "a" and "an" are intended to include one or more items and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
   receiving, by a device, a request to increase power to a load,
      wherein the load is configured to be powered by one or more of a plurality of engines;
   identifying, by the device, an engine, of the plurality of engines, that is to provide supplemental power to the load;
   determining, by the device, that an automatic control mode is enabled to control the engine to provide the supplemental power to the load,
      wherein the automatic control mode, when enabled, causes the engine to perform a warm-up operation before the engine is capable of providing the supplemental power;
   determining, by the device and based on an analysis of a load requirement of the load, that the warm-up operation for the engine is to be bypassed; and
   causing, by the device, the automatic control mode to bypass the warm-up operation for the engine to permit the engine to provide instantaneous power to the load by bypassing the warm-up operation associated with the engine.

2. The method of claim 1, wherein the warm-up operation is determined to be bypassed further based on receiving an operator input indicating that the warm-up operation is to be bypassed.

3. The method of claim 2, wherein the operator input is received based on:
   determining that a temperature of the engine satisfies a threshold;
   prompting, via an operator interface, an operator to indicate whether the warm-up operation is to be bypassed; and
   receiving, via the operator interface, the operator input.

4. The method of claim 1, wherein the engine is identified based on the engine being selected to provide the supplemental power according to the automatic control mode.

5. The method of claim 1, further comprising:
   determining that the automatic control mode can be overridden; and
   determining that a temperature of the engine satisfies a threshold,
      wherein the warm-up operation is determined to be bypassed further based on determining that the automatic control mode can be overridden and that the temperature of the engine satisfies the threshold.

6. The method of claim 1, wherein the engine is identified based on being one of the plurality of engines that is not supplying power to the load when the request is received, wherein causing the automatic control mode to bypass the warm-up operation causes the engine to provide power to the load before the engine is warmed-up.

7. The method of claim 1, wherein causing the automatic control mode to bypass the warm-up operation comprises:
causing the engine to perform a startup operation; and
enabling electrical coupling of an output of the engine to the load before the engine reaches a threshold temperature corresponding to the engine completing the startup operation.

8. The method of claim 1, wherein the plurality of engines are generators of a power system and the power provided to the load is electrical power.

9. The method of claim 1, wherein the analysis is of the load requirement and current power output from one or more engines providing power to the load.

10. A device, comprising:
one or more memories; and
one or more processors, communicatively coupled to the one or more memories, configured to:
receive a request to increase power to a load,
wherein the load is powered by a first engine of a plurality of engines;
identify a second engine, of the plurality of engines, to provide supplemental power to the load;
determine that a temperature of the second engine satisfies a threshold,
wherein the threshold indicates that the second engine is to undergo a warm-up operation before the second engine is to provide the supplemental power to the load;
determine, based on an analysis of a load requirement of the load, that the warm-up operation is to be bypassed to permit the second engine to instantaneously provide supplemental power to the load;
cause the second engine to perform a startup operation; and
cause, in association with the startup operation, an output of the second engine to be electrically coupled to the load to cause the second engine to provide the supplemental power to the load before the temperature of the second engine reaches the threshold.

11. The device of claim 10, wherein the one or more processors are further configured to:
enable, based on determining that the temperature of the second engine satisfies the threshold, an operator interface that can be used to indicate that the warm-up operation is to be bypassed; and
receive an operator input, via the operator interface, that indicates that the warm-up operation is to be bypassed,
wherein the warm-up operation is determined to be bypassed further based on receiving the operator input.

12. The device of claim 10, wherein the second engine is identified based on an automatic control mode selecting the second engine to provide the supplemental power.

13. The device of claim 10, wherein the engine is identified based on being one of the plurality of engines that is not supplying power to the load when the request is received.

14. The device of claim 10, wherein the startup operation includes at least one of:
performing an ignition operation to engage an ignition of the second engine, or
controlling fuel to the second engine until the temperature of the second engine reaches the threshold.

15. A system comprising:
a plurality of engines;
a monitoring system configured to monitor the plurality of engines; and
an engine controller configured to:
determine that power to a load is to be increased,
wherein the load is configured to be powered by one or more of the plurality of engines;
determine that an engine, of the plurality of engines, is configured to provide supplemental power to the load after a temperature of the engine satisfies a threshold,
wherein the threshold corresponds to a warm-up operation of the engine being completed;
determine, from a measurement of the monitoring system, that the temperature of the engine does not satisfy the threshold;
obtain, via an operator interface, an authorization to bypass the warm-up operation of the engine; and
bypass, based on obtaining the authorization and based on an analysis of a load requirement of the load, the warm-up operation for the engine to permit the engine to provide instantaneous power to the load.

16. The system of claim 15, wherein the engine controller is configured to determine that the power to the load is to be increased based on receiving, via the operator interface, a request to increase the power to the load.

17. The system of claim 15, wherein the engine controller, when obtaining the authorization, is configured to:
prompt, via the operator interface, an operator to provide an operator input corresponding to the authorization.

18. The system of claim 17, wherein, when prompting the operator, the engine controller is configured to cause a dialog box to be presented via the operator interface,
wherein the dialog box requests the operator to indicate whether the engine is to provide the instantaneous power to the load.

19. The system of claim 15, wherein the engine controller, when obtaining the authorization, is configured to:
enable the operator interface to permit the operator to provide the authorization.

20. The system of claim 15, wherein the engine controller is configured to cause the engine to provide the instantaneous power to the load after causing the engine to perform an ignition operation to start the engine.

* * * * *